(12) United States Patent
Zadeh et al.

(10) Patent No.: US 6,385,452 B1
(45) Date of Patent: *May 7, 2002

(54) SYSTEM AND METHOD FOR DETERMINING ABSOLUTE TIME BASED UPON AIR INTERFACE TIMING IN TIME OF ARRIVAL BASED POSITIONING

(75) Inventors: Bagher R. Zadeh, Dallas, TX (US); Dan Lindqvist, Sollentuna (SE)

(73) Assignee: Ericsson Inc., Research Triangle Park, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/362,777

(22) Filed: Jul. 28, 1999

(51) Int. Cl.[7] .................................. H04Q 7/20
(52) U.S. Cl. ........................ 455/440; 455/436; 455/456; 370/331; 342/357.01
(58) Field of Search .................... 455/440, 439, 455/432–433, 436, 442, 456; 342/126, 146, 357.1; 370/331, 337

(56) References Cited

U.S. PATENT DOCUMENTS 6,295,455 B1 * 9/2001 Fischer et al. .............. 455/456

* cited by examiner

*Primary Examiner*—William Trost
*Assistant Examiner*—Simon Nguyen
(74) *Attorney, Agent, or Firm*—Jenkens & Gilchrist, P.C.

(57) ABSTRACT

A telecommunications system and method is disclosed for reducing the signaling load on the network by instructing a Location Measurement Unit (LMU) to measure the relation between the absolute time and air interface timing, e.g., TDMA frame number, only when a positioning request has been received. Prior to configuring the LMU for time of arrival (TOA)-based positioning of a particular mobile station, the Serving Mobile Location Center (SMLC) can request an LMU associated with a particular cell to perform an asynchronous handover within the same cell. During this asynchronous handover, the LMU measures the relation between the absolute time and the TDMA frame number, and sends this relation information to the SMLC. The SMLC uses this relation information in configuring the LMU for TOA-based positioning of the particular mobile station.

31 Claims, 5 Drawing Sheets

SYSTEM AND METHOD FOR DETERMINING ABSOLUTE TIME BASED UPON AIR INTERFACE TIMING IN TIME OF ARRIVAL BASED POSITIONING

BACKGROUND OF THE PRESENT INVENTION

1. Field of the Invention

The present invention relates generally to telecommunications systems and methods for positioning a mobile station within a cellular network, and specifically to positioning a mobile station using a time of arrival (TOA)-based positioning method.

2. Background of the Present Invention

Cellular telecommunications is one of the fastest growing and most demanding telecommunications applications. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

With reference now to FIG. 1 of the drawings, there is illustrated a GSM Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC 14 provides a circuit switched connection of speech and signaling information between a Mobile Station (MS) 20 and the PLMN 10. The MSC/VLR areas 12, in turn, include a plurality of Location Areas (LA) 18, which are defined as that part of a given MSC/VLR area 12 in which the MS 20 may move freely without having to send update location information to the MSC 14 that controls the LA 18. Each LA 18 is divided into a number of cells 22. The MS 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the cell 22 for which it is responsible. It should be understood that the BSC 23 may be connected to several BTS's 24, and may be implemented as a stand-alone node or integrated with the MSC 14. In either event, the BSC 23 and BTS 24 components, as a whole, are generally referred to as a Base Station System (BSS) 25.

The MS 20 and the BTS 24 communicate over a radio interface, which utilizes the Time Division Multiple Access (TDMA) concept. Each TDMA frame consists of a number of time slots, with one time slot per carrier frequency. Each time slot is referred to as a physical channel. Depending upon the type of information being transmitted, different types of logical channels are mapped onto these physical channels. For example, to transmit speech, the logical channel "traffic channel" must be mapped onto one of the physical channels. The information sent on one of these channels is called a burst. In addition, the TDMA frames are numbered in a cyclic pattern.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information, for subscribers registered within that PLMN 10. The HLR 26 may be co-located with a given MSC 14, integrated with the MSC 14, or alternatively can service multiple MSCs 14, the latter of which is illustrated in FIG. 1.

Determining the geographical position of an MS 20 within a cellular network 10 has recently become important for a wide range of applications. For example, location services (LCS) may be used by transport and taxi companies to determine the location of their vehicles. In addition, for emergency calls, e.g., 911 calls, the exact location of the MS 20 may be extremely important to the outcome of the emergency situation. Furthermore, LCS can be used to determine the location of a stolen car, for the detection of home zone calls, which are charged at a lower rate, for the detection of hot spots for micro cells, or for the subscriber to determine, for example, the nearest gas station, restaurant, or hospital, e.g., "Where am I" service.

As can be seen in FIG. 2 of the drawings, upon the reception of a positioning request from a Location Services (LCS) client 280, the MSC 14 sends a Mobile Application Part (MAP) PERFORM LOCATION message to a Serving Mobile Location Center (SMLC) 270 within the PLMN 10 associated with the MSC 14. The SMLC 270 is responsible for carrying out the positioning request and calculating the MS 20 location. It should be noted that more than one SMLC 270 may be located within each PLMN 10. Thereafter, the SMLC 270 determines the positioning method to use. If the Time of Arrival (TOA) positioning method is selected, the SMLC 270 returns a MAP CHANNEL INFORMATION message to the MSC 14. The MSC 14, in turn, forwards a Base Station Subsystem MAP (BSSMAP) CHANNEL INFORMATION message to the serving BSC 23, requesting the physical channel description of the traffic channel that will be used to perform a positioning handover. The message also includes information on the cell 22 ID's and TDMA frame numbers for the serving and candidate cells 22 to which positioning handovers are to be performed.

In response, the BSC 23 sends a BSSMAP CHANNEL INFORMATION ACK message to the MSC 14, which includes the requested physical channel description. The MSC 14 forwards this physical channel description to the SMLC 270, which uses the physical channel description to configure at least three Location Measurement Units (LMUs) 260 (only one of which is shown) within the PLMN 10. The LMUs 260 are responsible for obtaining positioning measurements and providing these measurements to the SMLC 270 for use in calculating the location of the MS 20. All communication to and from the LMUs 260 are sent over the air interface. Therefore, unless the LMU 260 is integrated with a BTS 24, each LMU 260 is in wireless communication with at least one associated BTS 24.

Once the SMLC 270 selects which LMUs 260 should obtain the positioning measurements, the SMLC 270 sends LCS Information Request messages to each of these selected LMUs 260. The LCS Information Request messages specify the absolute time that the LMUs 260 should begin to measure the time of arrival (TOA) of access bursts transmitted by the MS 20. The LMUs 260 only have knowledge of the absolute time, and do not have any information on the current TDMA frame number. Therefore, this absolute time must correspond to the TDMA frame number transmitted by the SMLC 270 to the BSC 23 in the CHANNEL INFORMATION message in order for positioning to occur. For example, if the transmitted TDMA frame number corresponds to starting time $t_0$ for one of the LMUs 260, but the SMLC 270 instructs that LMU 260 to begin listening at starting time $t_1$, then that LMU 260 will not begin listening to the access bursts transmitted by the MS 20 at the correct time. Thus, that LMU 260 will not be able to obtain positioning measurements, and, as a consequence, the SMLC 270 will not be able to calculate the location of the MS 20.

Therefore, TOA-based positioning requires knowledge of the relation between the absolute time and air interface timing, e.g., the TDMA frame number. Currently, the LMUs 260 monitor the TDMA frame number on a synchronization channel of an associated BTS 24 and determine the corresponding absolute time using a GPS receiver within the LMU 260 for that TDMA frame number. Thereafter, the LMU 260 periodically sends this information to the SMLC 270, which, in turn, stores this relation information in a database 275 therein. Later, when a positioning request is received, the SMLC 270 uses this relation information in the LMU 260 configuration process.

The periodicity of transmission of this relation information from the LMU 260 to the SMLC 270 can be as often as every 2 to 5 minutes. This creates increased signaling load on the network, especially when the SMLC 270 has not received a positioning request for that cell 22. Thus, the LMUs 260 are making these measurements and sending the results to the SMLC 270 even when the SMLC 270 does not need this information.

SUMMARY OF THE INVENTION

The present invention is directed to telecommunications systems and methods for reducing the signaling load on the network by instructing a Location Measurement Unit (LMU) to measure the relation between the absolute time and air interface timing, e.g., TDMA frame number, only when a positioning request has been received. Prior to configuring the LMU for time of arrival (TOA)-based positioning of a particular mobile station, the Serving Mobile Location Center (SMLC) can request an LMU associated with a particular cell to perform an asynchronous handover within the same cell. During this asynchronous handover, the LMU measures the relation between the absolute time and the TDMA frame number, and sends this relation information to the SMLC. The SMLC uses this relation information in configuring the LMU for TOA-based positioning of the particular mobile station.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
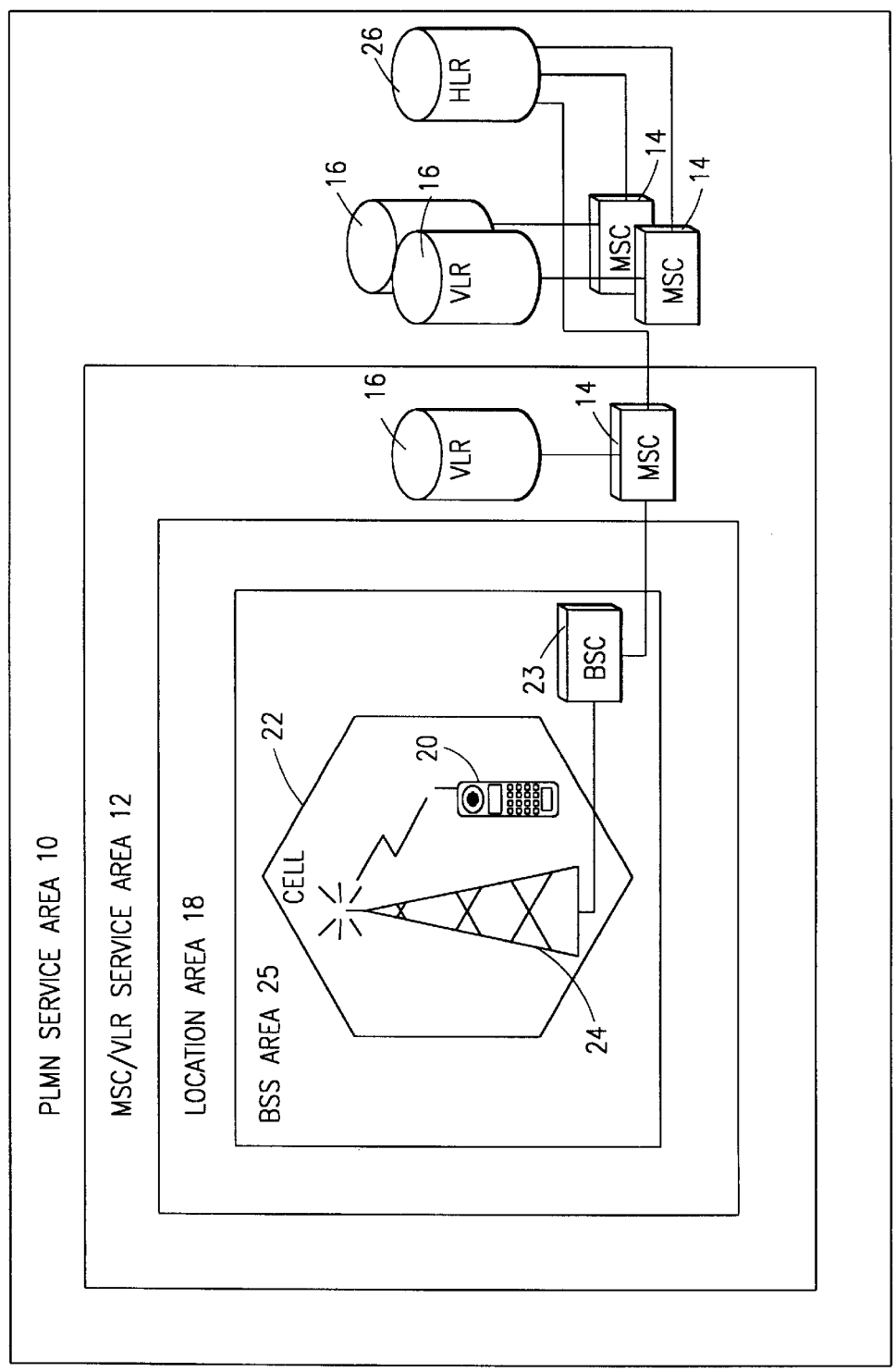
FIG. 1 is a block diagram of a conventional cellular network.
Figure 2:
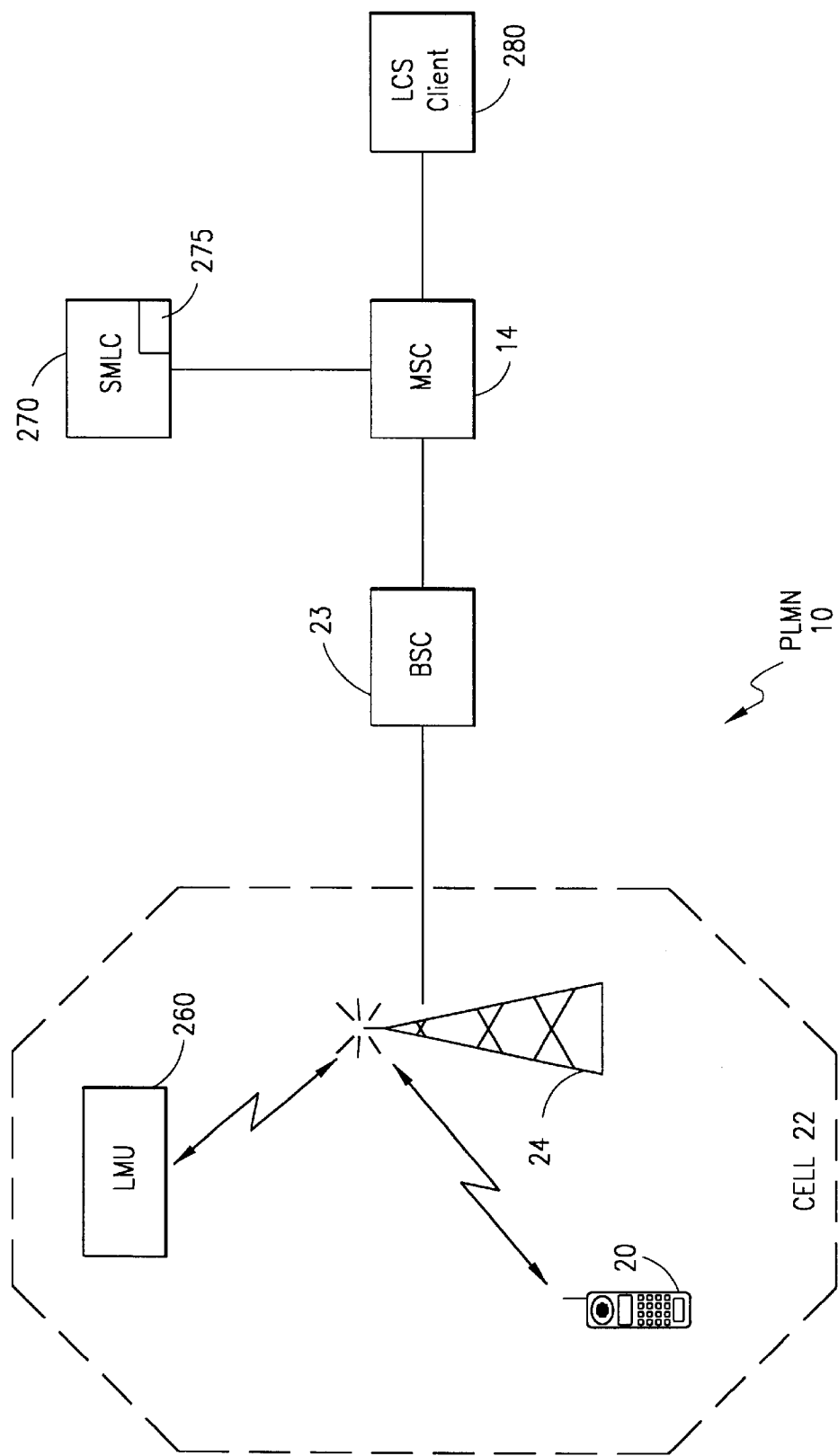
FIG. 2 illustrates a positioning of a mobile station within a cellular network.
Figure 3:
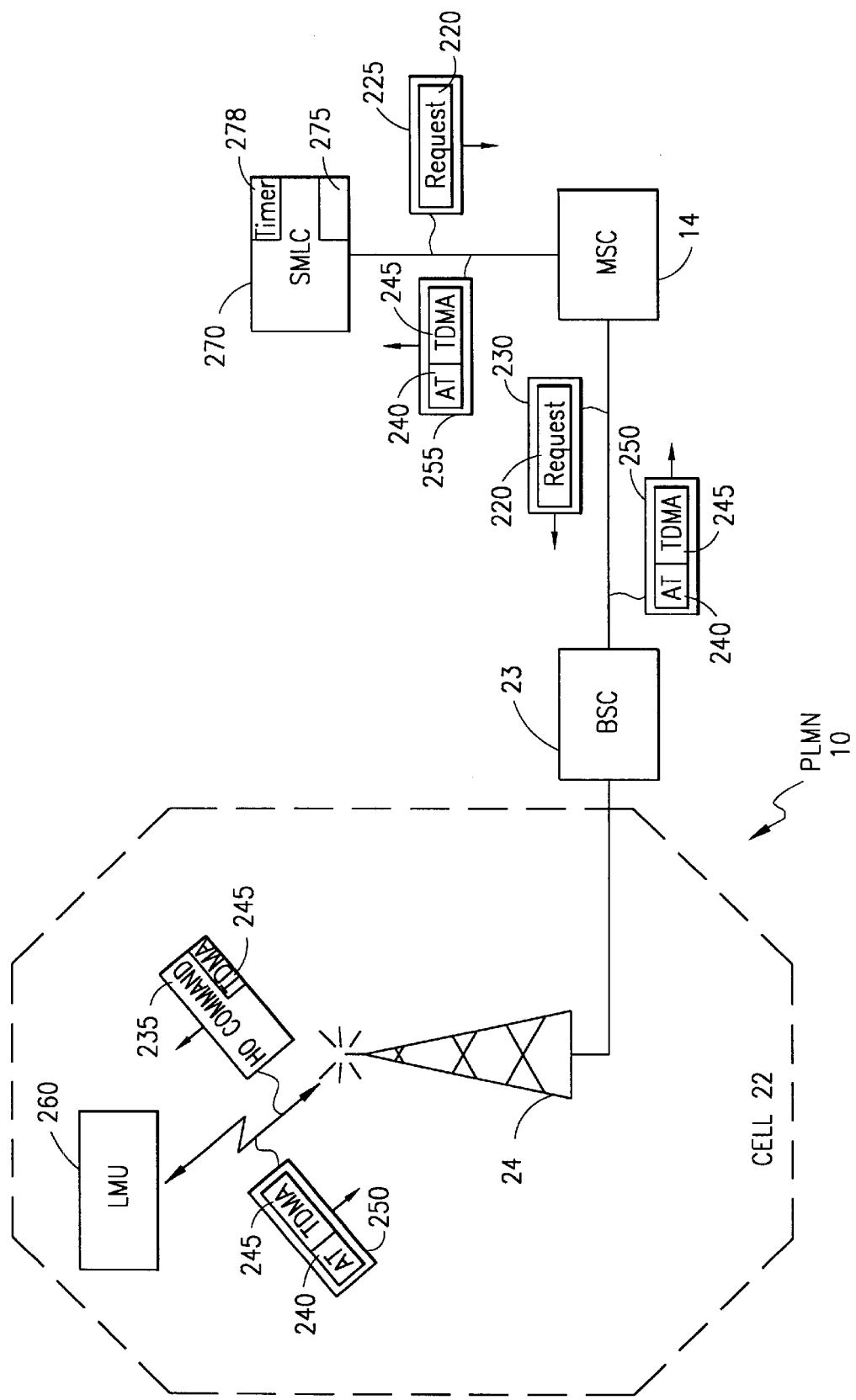
FIG. 3 illustrates a sample measurement of the relation between the absolute time and air interface timing by a Location Measurement Unit (LMU), in accordance with preferred embodiments of the present invention.

With reference now to FIG. 3 of the drawings, in order to reduce the signaling load on a network 10, a Location Measurement Unit (LMU) 260 can obtain relation information between air interface timing and absolute time, and transmit this relation information to a Serving Mobile Location Center (SMLC) 270 only after a positioning request has been received by the SMLC 270. Once the SMLC 270 receives the positioning request, the SMLC 270 can send a request 220 to a Mobile Switching Center (MSC) 14 for update timing relation information for the LMU 260. This request 220 can be included within a Mobile Application Part (MAP) CHANNEL INFORMATION message 225 sent from the SMLC 270 to the MSC 14, which, in turn, transmits this request in a Base Station Subsystem MAP (BSSMAP) CHANNEL INFORMATION message 230 to a Base Station Controller (BSC) 23 associated with the LMU 260. In response to the request 220, the BSC 23 sends an asynchronous intra-cell Handover Command 235 to the LMU 260 via a Base Transceiver Station (BTS) 24 serving a cell 22 that the LMU 260 is associated with. The Handover Command 235 instructs the LMU 260 to perform an asynchronous handover within the same cell 22. This handover is similar to an asynchronous intra-cell handover in TOA-based positioning. However, unlike the TOA-based positioning intra-cell handover, the LMU 260 asynchronous handover does not fail. In addition, the LMU 260 intra-cell handover can be performed on either a signaling channel (SDCCH) or a traffic channel (TCH).

During the asynchronous intra-cell handover, the LMU 260 clocks a current TDMA frame number 245 in use by the BTS 24 with an absolute time 240 using the LMU's 260 internal GPS receiver. Each BTS 24 has an internal clock associated therewith. Each TDMA frame number takes a certain number of milliseconds to transmit. Therefore, each BTS 24 associates a TDMA frame number with a certain time of that BTS's 24 internal clock. By contrast, the LMUs 260 have absolute clocks associated therewith. The absolute clock time does not always correspond with the internal clock time of a particular BTS 24.

Therefore, the LMUs 260 must determine the absolute time 240 associated with the current TDMA frame number 245 in order to synchronize the LMU 260 starting time for obtaining TOA positioning measurements with the transmission of access bursts on a particular TDMA frame number. This relation information, e.g., absolute time 240 and associated TDMA frame number 245 for the LMU 260, is transmitted from the LMU 260 in a Direct Transfer Application Part (DTAP) message 250 to the MSC 14, which converts the DTAP message 250 into a MAP message 255, and transmits this MAP message 255, including the relation information 240 and 245, to the SMLC 270.

An intra-cell handover is normally performed when the BSC 23 considers the quality of the connection too low, but the BSC 23 receives no indication than another cell 22 would be better. In that case, the BSC 23 switches the connection to another channel in the same cell 22. This normal intra-cell handover is an assignment command, e.g., the BSC 23 assigns a new channel to the connection. However, the TDMA frame number is not typically included in an assignment command. Therefore, in order for the LMU 260 to obtain the current TDMA frame number 245, the BSC 23 must order an asynchronous intra-cell handover.

To complete the asynchronous intra-cell handover, the BSC 23 sends a Handover Command to the LMU 260, which contains information about the frequency, current TDMA frame number 245 and time slot that the LMU 260 must switch to. The LMU 260 correlates this received current TDMA frame number 245 with the current absolute time 240 within the LMU 260. Thereafter, the LMU 260 tunes to the new frequency and transmits Handover Access bursts in the correct time slot. When the BTS 24 detects these access bursts, the BTS 24 sends timing advance information to the LMU 260, and the LMU 260 sends a Handover Complete message to the BSC 23. After the handover has been completed, the LMU 260 transmits the relation information 240 and 245 to the SMLC 270.

By utilizing the existing asynchronous intra-cell handover process used in TOA-based positioning, the relation information 240 and 245 can be obtained only when it is needed. Therefore, there is no need for the SMLC 270 to maintain or update a database 275 containing the relation between the absolute time 240 and TDMA frame number 245 for each LMU 260.

In an alternative embodiment, the SMLC 270 can maintain and update the database 275 each time new relation information 240 and 245 is received. In addition, the SMLC 270 (or LMU 260) can have a timer 278 therein for reducing the number of requests 220 for update relation information 240 and 245. For example, if the timer 278 is within the SMLC 270, when the SMLC 270 receives update relation information 240 and 245, the SMLC 270 can initiate the timer 278. If another positioning request is received before the expiration of the timer 278, the SMLC 270 does not send another request 220 for update relation information 240 and 245.

Figure 4:
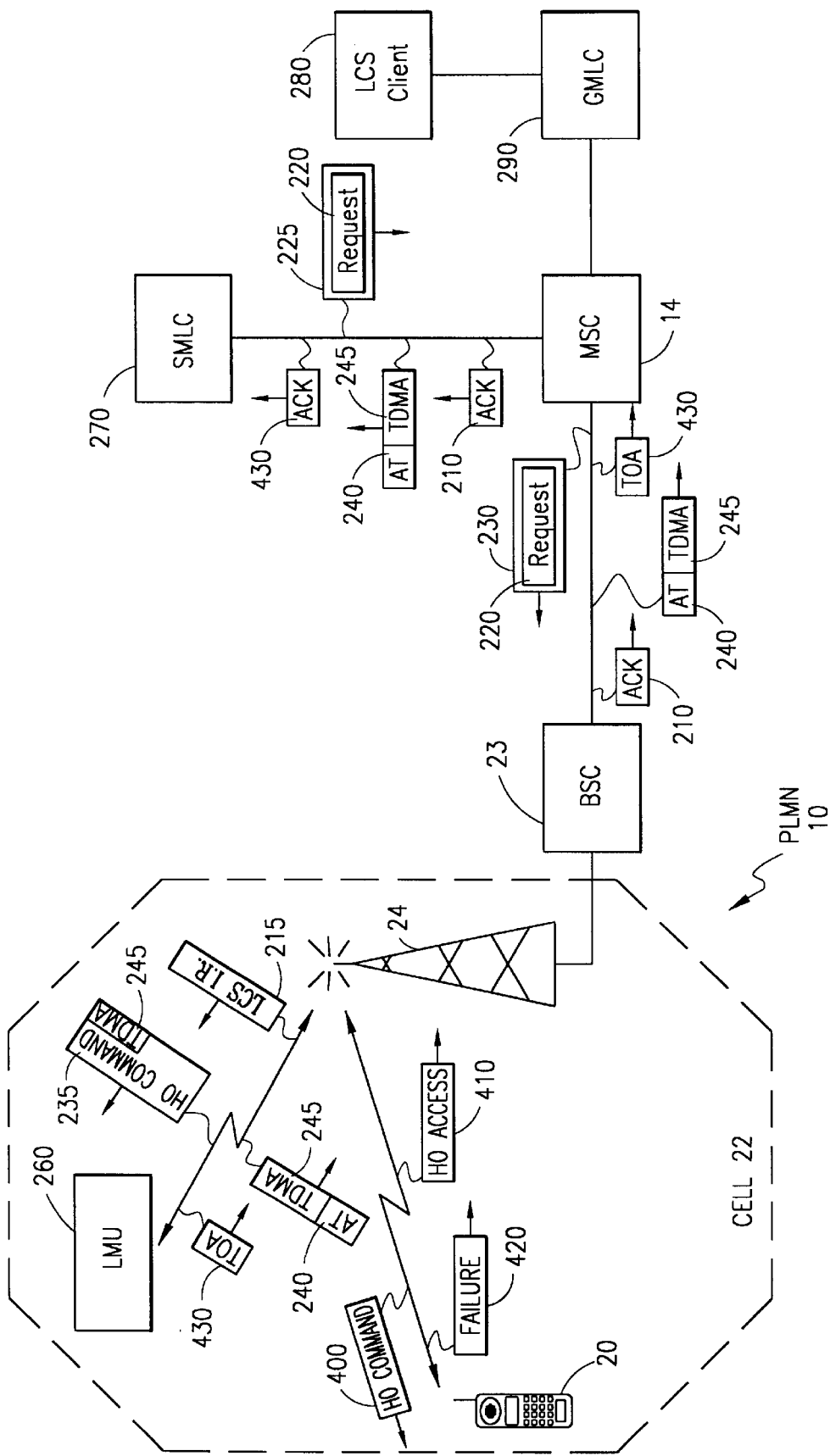
FIG. 4 illustrates a Time of Arrival (TOA)-based positioning of a mobile station using relation information obtained by the LMU in accordance with preferred embodiments of the present invention.
Figure 5:
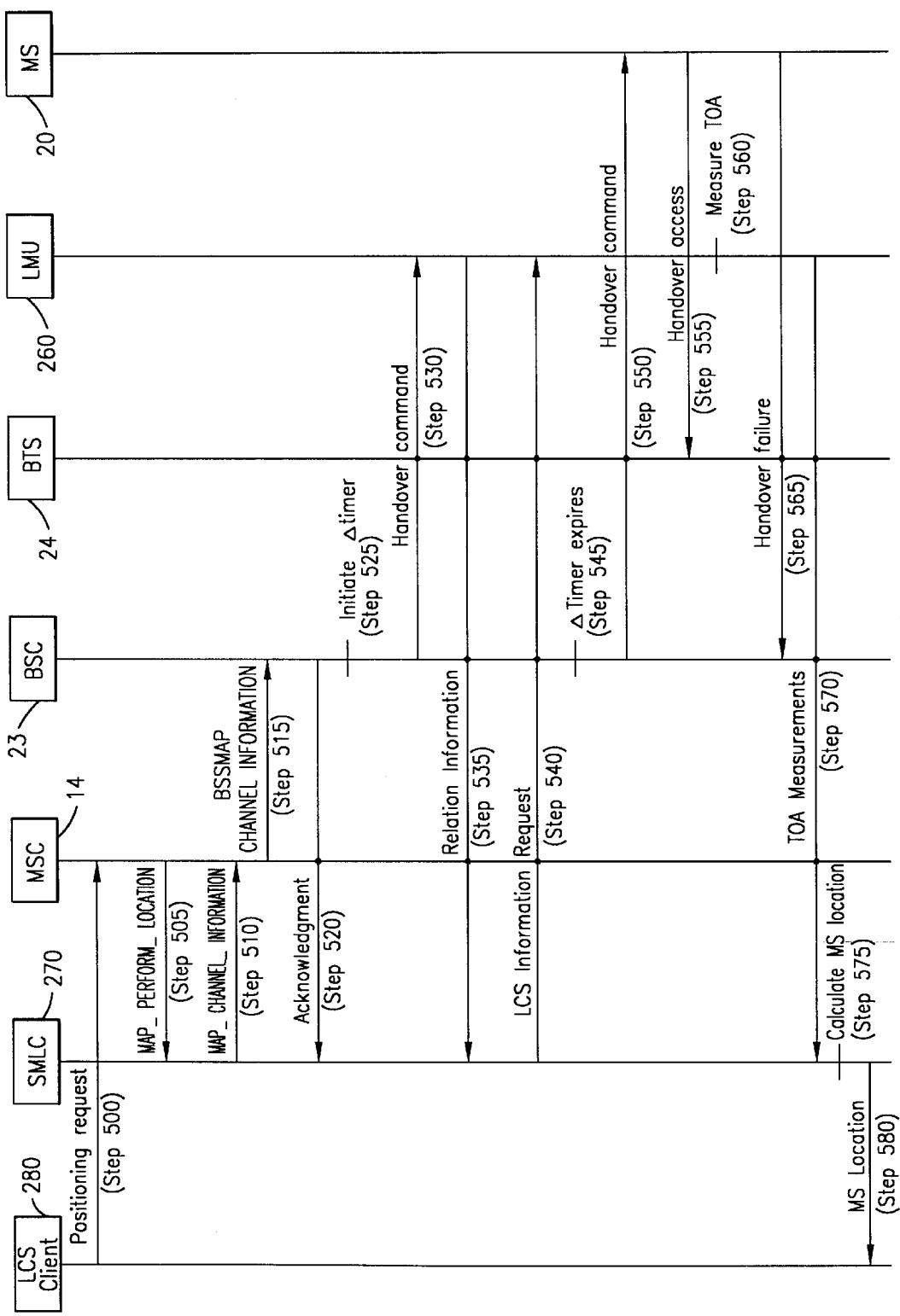
FIG. 5 is a signaling diagram illustrating the steps for performing the TQA-based positioning shown in FIG. 4 of the drawings.

With reference now to FIG. 4 of the drawings, which will be described in connection with the steps listed in FIG. 5 of the drawings, upon the reception of a positioning request from a Location Services (LCS) client 280 (step 500), the MSC 14 sends a Mobile Application Part (MAP) PERFORM LOCATION message to the SMLC 270 within the PLMN 10 associated with the MSC 14 (step 505). Once the SMLC 270 selects the TOA-based positioning method, the SMLC 270 returns a MAP CHANNEL INFORMATION message 225 to the MSC 14 (step 510). The information contained in this message includes a value for a BSC delta timer (not shown), the maximum call setup time, and an indication of the preferred positioning handover type, such as intra-cell to the same channel, intra-cell to a new channel or inter-cell. In addition, the message also contains the identification of the cells 22 to which positioning handovers are to be performed, along with the associated TDMA frame numbers to use for the positioning handovers. Furthermore, in accordance with embodiments of the present invention, the message may also include the request 220 for update timing relation information 240 and 245 from one or more LMUs 260 (only one of which is shown).

When the MSC 14 receives the MAP CHANNEL INFORMATION message 225 from the SMLC 270, the MSC 14 forwards the information 220 in this message 225 to the BSC 23 in the BSSMAP CHANNEL INFORMATION message 230 (step 515). The BSSMAP CHANNEL INFORMATION message 230 further requests the physical channel description for the traffic channel that the BSC 23 will assign for each positioning handover, taking into consideration the preferred positioning handover type(s). The BSC 23 includes this physical channel information, such as the frequency, hopping sequence, channel type and time slot for access bursts for each positioning handover, in an acknowledgment message 210 to the to the SMLC 270 (step 520). At substantially the same time that the BSC 23 transmits the acknowledgment message 210, the BSC 23 initiates the delta timer (step 525), and sends the intra-cell asynchronous Handover Command 235 to the LMU(s) 260 (step 530). The LMU(s) 260 perform the asynchronous handover, obtain the requested relation information 240 and 245 and transmit this relation information 240 and 245 to the SMLC 270 (step 535).

The SMLC 270 configures the LMU(s) 260 using the channel information in the acknowledgment message 210 and update relation information 240 and 245, and transmits an LCS Information Request message 215 to each selected LMU 260 via the MSC 14, BSC 23 and BTS 24 over the air interface (step 540). Each LCS Information Request message 215 is targeted to one LMU 260, and specifies the radio frequency list, hopping sequence information, HO reference number, BSIC, starting time, measurement options, start time uncertainty and GPS time stamping request.

At the expiration of the delta timer within the BSC 23 (step 545), the BSC 23 begins the positioning handover process. The delta timer is used to ensure that the SMLC 270 has enough time to configure the LMUs 260 prior to initiating the positioning handover process. A positioning handover occurs when the BSC 23 sends a HANDOVER (HO) COMMAND message 400 to the MS 20 (step 550), instructing the MS 20 to perform a handover to the serving BTS 24 or a target BTS (not shown) on a specified channel. The HO COMMAND message 400 also indicates the TDMA frame number that the MS 20 should begin sending access bursts. When the MS 20 starts sending the access bursts in a HANDOVER ACCESS message 410 (step 555), the configured LMUs 260 measure the Time of Arrival (TA) of these access bursts (step 560). Since the handover is a positioning handover, and not a radio-related handover, the BTS 24 will not respond to the HANDOVER ACCESS message 410, and the MS 20 will stop sending the access bursts upon the expiration of a timer (not shown) within the MS 20. Thereafter, the MS 20 returns to the old channel that it was assigned to, and sends a HANDOVER FAILURE message 420 to the BSC 23 (step 565).

These TOA measurements 430 are forwarded from the LMUs 260 to the SMLC 270 (step 570) for use in assisting the calculation of the geographical location of the MS 20 (step 575). After the SMLC 270 calculates the MS 20 location (step 575), this location is transmitted to the LCS client 280 that requested the positioning (step 580). It should be noted that the requesting client 280 could be located within the MS 20 itself, within the MSC 14 or could be an external node, such as an Intelligent Network (IN) node. If the client 280 is not within the MS 20 or within the MSC 14, the location information is sent to the requesting client 280 via the MSC 14 and a Gateway Mobile Location Center (GMLC) 290.

As will be recognized by those skilled in the art, the innovative concepts described in the present application can be modified and varied over a wide range of applications.

Accordingly, the scope of patented subject matter should not be limited to any of the specific exemplary teachings discussed, but is instead defined by the following claims.

What is claimed is:

1. A telecommunications system for determining update relation information corresponding to a current absolute time and an associated current time division multiple access frame number, comprising:
    a serving mobile location center for receiving a positioning request and sending a request for said update relation information in response to receiving said positioning request;
    a base station controller for receiving said request for said update relation information from said serving mobile location center and generating an asynchronous intra-cell handover command in response thereto; and
    at least one location measurement unit in communication with said base station controller for receiving said asynchronous intra-cell handover command from said base station controller, performing an asynchronous intra-cell handover, obtaining said update relation information during said handover and transmitting said update relation information to said serving mobile location center for use by said serving mobile location center in a subsequent time of arrival based positioning of a mobile station.

2. The telecommunications system of claim 1, wherein said request for update relation information is included within a Mobile Application Part Channel Information message.

3. The telecommunications system of claim 2, further comprising:
    a mobile switching center connected to said base station controller for receiving said Mobile Application Part Channel Information message, converting said Mobile Application Part Channel Information message into a Base Station Subsystem Mobile Application Part Channel Information message and transmitting said Base Station Subsystem Mobile Application Part Channel Information message to said base station controller.

4. The telecommunications system of claim 1, further comprising:
    a base transceiver station connected to said base station controller and in wireless communication with said at least one location measurement unit, said asynchronous intra-cell handover being performed to said base transceiver station.

5. The telecommunications system of claim 4, wherein said base transceiver station sends information to said at least one location measurement unit during said asynchronous intra-cell handover.

6. The telecommunications system of claim 1, wherein said asynchronous intra-cell handover command includes said current time division multiple access frame number.

7. The telecommunications system of claim 6, wherein said at least one location measurement unit correlates said current absolute time value within said at least one location measurement unit with said received current time division multiple access frame number to determine said update relation information.

8. The telecommunications system of claim 1, further comprising:
    a timer within said serving mobile location center, said serving mobile location center initiating said timer upon receipt of previous update relation information.

9. The telecommunications system of claim 8, wherein said serving mobile location center determines whether said timer has expired upon receipt of said positioning request, said request for update relation information being sent only when said timer has expired.

10. The telecommunications system of claim 1, further comprising:
    a database within said serving mobile location center for storing said update relation information.

11. A method for determining update relation information corresponding to a current absolute time and an associated current time division multiple access frame number, comprising the steps of:
    receiving at a serving mobile location center a positioning request;
    sending a request for said update relation information for at least one location measurement unit in response to receiving said positioning request; and
    receiving said update relation information from said at least one location measurement unit at said serving mobile location center for use in a subsequent time of arrival based positioning of a mobile station.

12. The method of claim 11, wherein said step of sending further comprises the step of:
    sending said request for update relation information within a Mobile Application Part Channel Information message.

13. The method of claim 11, wherein said step of receiving said update relation information further comprises the step of:
    receiving at said serving mobile location center said current absolute time value associated with said at least one location measurement unit and said associated current time division multiple access frame number.

14. The method of claim 11, further comprising the step of:
    initiating a timer within said serving mobile location center upon receipt of previous update relation information.

15. The method of claim 14, wherein said step of sending further comprises the steps of:
    determining whether said timer has expired upon receipt of said positioning request; and
    if said timer has expired, sending said request for update relation information.

16. The method of claim 11, further comprising the step of:
    storing said update relation information within a database within said serving mobile location center.

17. A method for determining update relation information corresponding to a current absolute time and an associated current time division multiple access frame number, comprising the steps of:
    receiving an asynchronous intra-cell handover command at a location measurement unit from a said base station controller in communication with said location measurement unit;
    performing an asynchronous intra-cell handover by said location measurement unit;
    obtaining update relation information during said handover; and
    transmitting said update relation information to a serving mobile location center connected to said base station controller for use in a subsequent time of arrival based positioning of a mobile station.

18. The method of claim 17, wherein said asynchronous intra-cell handover command includes said current time division multiple access frame number.

19. The method of claim 18, wherein said step of obtaining further comprises the step of:
   correlating said current absolute time value within said at least one location measurement unit with said received current time division multiple access frame number to determine said update relation information.

20. The method of claim 17, wherein said step of performing further comprises the step of:
   receiving, at said at least one location measurement unit, information from a base transceiver station in communication with said at least one location measurement unit during said asynchronous intra-cell handover.

21. A method for positioning a mobile station within a cellular network, comprising the steps of:
   receiving at a serving mobile location center a positioning request;
   sending a request for update relation information corresponding to a current absolute time and an associated current time division multiple access frame number for at least one location measurement unit to a base station controller in response to receiving said positioning request;
   receiving, by said at least one location measurement unit, an asynchronous intra-cell handover command from said base station controller;
   obtaining, by said at least one location measurement unit, said update relation information during an asynchronous intra-cell handover; and
   transmitting said update relation information from said at least one location measurement unit to said serving mobile location center via said base station controller for use in a subsequent time of arrival based positioning of said mobile station.

22. The method of claim 21, wherein said asynchronous intra-cell handover command includes said current time division multiple access frame number.

23. The method of claim 22, wherein said step of obtaining further comprises the step of:
   correlating said current absolute time value within said at least one location measurement unit with said received current time division multiple access frame number to determine said update relation information.

24. The method of claim 21, further comprising the step of:
   initiating a timer within said serving mobile location center upon receipt of previous update relation information.

25. The method of claim 24, wherein said step of sending said request further comprises the step of:
   determining, by said serving mobile location center, whether said timer has expired upon receipt of said positioning request;
   if said timer has expired, sending said request for update relation information.

26. The method of claim 21, further comprising the step of:
   storing, within a database within said serving mobile location center, said update relation information.

27. The method of claim 21, further comprising the step of:
   configuring, by said serving mobile location center, said at least one location measurement unit using said received update relation information.

28. The method of claim 27, wherein said step of configuring further comprises the step of:
   transmitting a Location Services Information Request message from said serving mobile location center to said at least one location measurement unit.

29. The method of claim 28, further comprising the steps of:
   obtaining, by said at least one location measurement unit, positioning measurements in response to said Location Services Information Request message; and
   transmitting said positioning measurements to said serving mobile location center.

30. The method of claim 29, further comprising the step of:
   calculating, by said serving mobile location unit, a location of said mobile station using said positioning measurements.

31. The method of claim 21, wherein said step of performing further comprises the step of:
   receiving, at said at least one location measurement unit, information from a base transceiver station in communication with said at least one location measurement unit during said asynchronous intra-cell handover.

* * * * *